(12) United States Patent
Curtis (10) Patent No.: US 6,209,478 B1
(45) Date of Patent: Apr. 3, 2001

(54) GARAGE DOOR WITH OPENER AND PARKING POSITION INDICATOR

(76) Inventor: Vern L. Curtis, 4820 Bear Creek Pl., Tucson, AZ (US) 85749

( * ) Notice: Subject to any disclaimer, the term of this patent is extended or adjusted under 35 U.S.C. 154(b) by 0 days.

(21) Appl. No.: 09/248,255

(22) Filed: Feb. 11, 1999

(51) Int. Cl.[7] .................................................. B60Q 9/00
(52) U.S. Cl. .............................................. 116/28 R; 33/264
(58) Field of Search .......................... 116/28 R; 33/264, 33/286; 340/932.2

(56) References Cited

U.S. PATENT DOCUMENTS

| | | | |
|---|---|---|---|
| 3,817,203 | 6/1974 | Brauer | 116/28 R |
| 3,872,820 | * 3/1975 | Hess | 116/28 R |
| 3,874,322 | 4/1975 | Brauer | 116/28 R |
| 4,490,917 | * 1/1985 | Pilling | 116/28 R |
| 5,297,500 | * 3/1994 | Wilson | 116/28 R |
| 5,315,953 | * 5/1994 | Mullarkey, Jr. | 116/28 R |
| 5,832,865 | 11/1998 | Harmel | 116/28 R |

* cited by examiner

*Primary Examiner*—Andrew H. Hirshfeld
(74) *Attorney, Agent, or Firm*—Antonio R. Durando (57) ABSTRACT

A garage includes a garage door which can be opened and closed by a garage door opener or by hand. A pendant suspended from a cord is movable from a raised position when the garage door is closed to a lowered position when the garage door is open. In the lowered position, the pendant is at the height of the windshield of a vehicle and at the eye level of the driver. When a vehicle enters the garage and the windshield contacts the pendant, the vehicle is properly positioned in the garage. The cord is attached to a reel which winds up the cord when the pendant is raised and pays out the cord when the pendant is lowered. The reel is driven in at least one direction by an internal spring, by a spring of the garage door opener or by the motor of the garage door opener.

15 Claims, 10 Drawing Sheets

GARAGE DOOR WITH OPENER AND PARKING POSITION INDICATOR

BACKGROUND OF THE INVENTION

1. Field of the Invention

The invention relates to a garage having a parking position indicator which moves in response to the garage door.

2. Description of the Prior Art

The space available in the garage of a home is generally restricted. Upon pulling a vehicle into the garage, it is difficult to know when the vehicle is properly positioned. This is especially true for a large vehicle.

To assist in the proper positioning of a vehicle in a garage, parking position indicators have been developed. One type of indicator consists of an object suspended from a flexible element such as a cord. When the windshield of a vehicle touches the object, the vehicle is properly positioned in the garage.

The object can be suspended from a fixed location of the garage ceiling. However, the object then hinders freedom of movement in the garage when the vehicle is not present.

To overcome this drawback, the object is suspended in such a manner that it rises to the ceiling as the garage door closes and drops to windshield height as the garage door opens. This is currently achieved by attaching the cord from which the object is suspended to the garage door.

In most garages, the distance from windshield height to ceiling is less than the distance through which the garage moves. Hence, it is necessary to compensate for the difference in the distance of travel of the object and the distance of travel of the garage door.

As disclosed in U.S. Pat. No. 5,832,865, one conventional manner of compensating for the difference in the distances of travel is to make at least part of the cord elastic. This has the disadvantage that the cord loses its elasticity over time and will eventually snap. When the cord snaps, damage or injury can occurs As shown in U.S. Pat. Nos. 3,874,322 and 3,817,203, another conventional manner of compensating for the difference in the distance of travel of the object and the distance of travel of the garage door involves the use of a reel having two portions of different diameter. Two cords are employed with one of the cords being attached to the garage door as well as the larger-diameter portion of the reel. The second cord carries the object and is attached to the smaller-diameter portion of the reel. As the garage door closes, the cord attached to the garage door is pulled by the latter and unwound from the reel. The reel then rotates in a sense such that the cord with the object is wound onto the reel thereby causing the object to rise. When the garage door opens so that the cord attached to the garage door is no longer under tension, the reel rotates under the weight of the object and the object drops. The cord attached to the object is unwound from the reel whereas the cord attached to the garage door is wound onto the reel.

The last arrangement for indicating parking position is somewhat complex. Thus, the arrangement requires two cords with a suitable ratio of lengths. Moreover, the arrangement requires the reel to have two portions whose diameters differ and lie in a specific proportion.

SUMMARY OF THE INVENTION

It is an object of the invention to provide a parking position indicating arrangement which allows complexity to be reduced.

Another object of the invention is to provide a parking position indicating arrangement which enables the likelihood of damage or injury to be decreased.

An additional object of the invention is to provide a parking method which permits a less complicated parking position indicating arrangement to be employed.

A further object of the invention is to provide a parking method which makes it possible to reduce the chances of damage or injury by a parking position indicating arrangement.

The preceding objects, as well as others which will become apparent as the description proceeds, are achieved by the invention.

One aspect of the invention resides in a garage comprising a garage door movable between a closed position and an open position, and means for moving the garage door between the closed position and the open position. The garage further comprises means for indicating a parking position when the garage door is in the open position. The indicating means includes an elongated flexible element, and a coiling member for winding up and paying out the flexible element in response to movement of the garage door. The coiling member comprises a reel driven by an energy source which constitutes part of the moving means or part of the coiling member.

The use of a reel to wind up and pay out the flexible element makes it unnecessary for all or part of the flexible element to be elastic. This reduces the likelihood that the flexible element will snap in such a manner as to cause damage or injury.

Since the reel is driven by an energy source which constitutes part of the garage door moving means or part of the coiling member, the object which indicates parking position need not be used for this purpose. Hence, it becomes possible to design the parking position indicating means without dual flexible elements and without two reel portions of different diameter.

Another aspect of the invention resides in a method of operating a garage door. The method comprises the steps of moving the garage door from a closed position to an open position employing moving means, and providing an indication of a parking position in response to the moving step. The method further comprises the steps of returning the garage door to the closed position employing the moving means, and removing the indication of the parking position. One of the providing step and removing step includes the operation of paying out at least a portion of a flexible element from a reel forming part of a coiling member. The other of the providing step and removing step includes the operation of winding such portion of the flexible element onto the reel. Furthermore, one of the winding operation and paying out operation comprises driving the reel with an energy source which constitutes part of the moving means or part of the coiling member.

The energy source may include a biasing element constituting part of the coiling member. The reel can then be mounted on the garage door or, alternatively, can be suspended from the flexible element and constitute a parking position indicator. In the latter case, the step of providing a parking position indication may involve lowering the coiling member while the step of removing the indication may involve raising the member.

The energy source may also comprise a motor constituting part of the moving means. Here, the reel can be mounted on the motor, on a rotatable shaft which forms part of the moving means and is connected to the garage door, or on a chain which forms part of the moving means and is driven by the motor and connected to the garage door.

The reel may include a winding core defining an axis of rotation, and a pair of axially spaced flanges on the core each having a plurality of openings. Each opening in one of the flanges is arranged to register with a respective opening in the other of the flanges. The method can here further comprise the step of adjusting the winding circumference of the reel, and the adjusting step may include inserting at least one pin-like element in registering ones of the openings in the flanges.

Additional features and advantages of the invention will be forthcoming from the following detailed description of preferred embodiments when read in conjunction with the accompanying drawings.

BRIEF DESCRIPTION OF THE DRAWINGS

FIGS. 4a and 4b are respectively a side view and rear view of an additional cord guide while

FIGS. 12a–12jj illustrate the shapes produced by a cord which is wound onto the coiling member of FIGS. 11a and 11b when the coiling member has different winding circumferences.

DESCRIPTION OF THE PREFERRED EMBODIMENTS

Figure 1A:
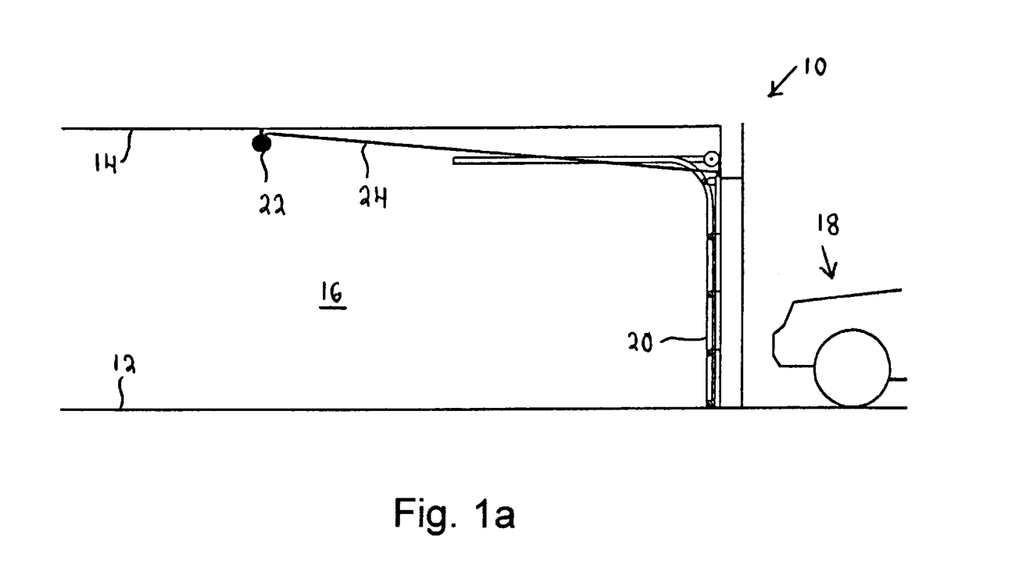
FIGS. 1a and 1b are schematic sectional side views of a garage illustrating the principle of operation of a parking position indicating arrangement according to the invention.

FIG. 1a schematically illustrates the principle of operation of a parking position indicating arrangement in accordance with the invention. In FIG. 1a, the numeral 10 identifies the garage of a private residence. The garage 10, which has a floor 12 and a ceiling 14, defines a space 16 serving as a parking area for a motor vehicle 18 and as a storage area. The motor vehicle 18 enters anti leaves the garage 10 through an entrance and exit opening which can be closed by a conventional garage door 20. The garage door 20 is movable between a raised or open position and a lowered or closed position by a non-illustrated automatic garage door opener or moving means. In FIG. 1a, the garage door 20 is in the closed position and closes the entrance and exit opening of the garage 10.

A pendant which constitutes a parking position indicator and is here in the form of a ball 22 is suspended from a cord or flexible element 24. When the garage door 20 is closed as in FIG. 1a, the ball 22 is in a raised or inoperative position and is located adjacent the garage ceiling 14.

In operation, the garage door 20 is opened when the vehicle 18 is to be parked in the garage 10. As the garage door 20 opens, the ball 22 drops to a lowered or operative position shown in FIG. 1b. In the lowered position, the ball 22 is located at the height of the windshield of the vehicle 18.

Figure 1B:
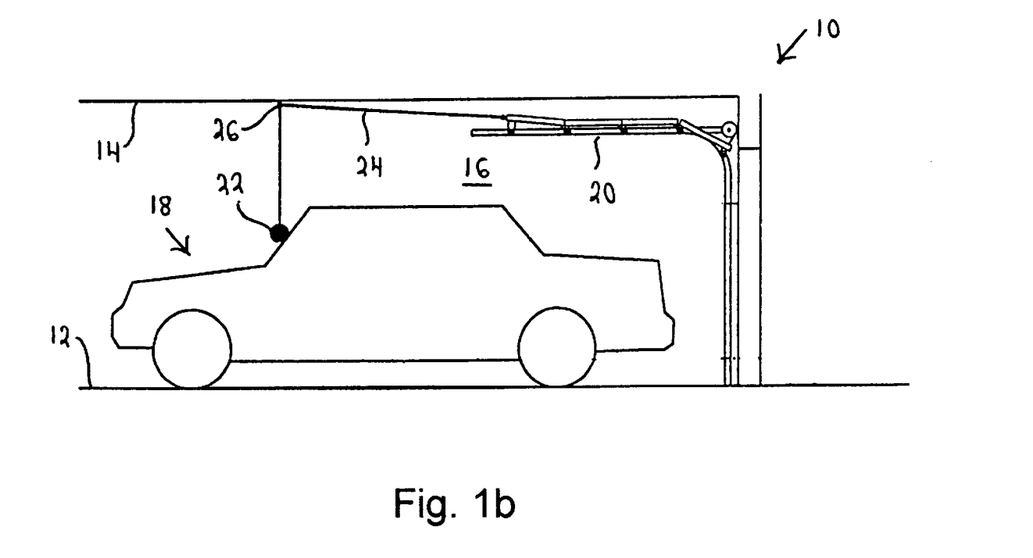

The vehicle 18 enters the garage 10 and moves forward until the windshield touches the ball 22. This is illustrated in FIG. 1b. At this time, the vehicle 18 is properly positioned in the garage 10 and is stopped. The garage door 20 is activated to close the same and, as the garage door 20 closes, the ball 22 returns to its raised position.

The ball 22 can be replaced with a device which rises automatically when touched by the windshield of the vehicle 18.

The cord 24 passes through a guide 26 which is fixed to the ceiling 14 of the (garage 10 and allows the cord 24 to slide easily. By way of example, the guide 26 may be a screw eye as illustrated in FIG. 2 car an elbow as illustrated in FIGS. 3a and 3b.

Figure 2:
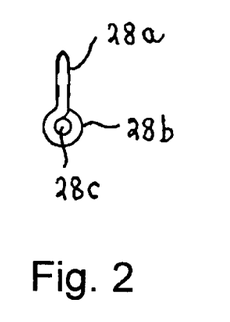
FIG. 2 is a plan view of a guide for a cord constituting part of the parking position indicating arrangement of FIGS. 1a and 1b.

The screw eye of FIG. 2 comprises a threaded shank 28a with a circular head 28b which defines an opening 28c for the cord 24.

Figure 3A:
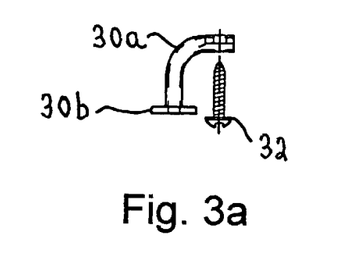
FIGS. 3a and 3b are respectively a side view and front view of another cord guide.
Figure 3B:
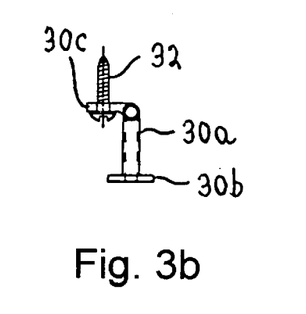

With reference to FIGS. 3a and 3b, the elbow includes a curved tubular section 30a extending through an angle of 90 degrees, a circular flange 30b surrounding one end of the curved section 30a, and an attachment flange 30c extending laterally from the other end of the tubular section 30a. The attachment flange 30c is provided with an opening for an attachment screw 32 which serves to fix the elbow to the ceiling 14 of the garage 10. The circular flange 30b constitutes a stop or abutment for the ball 22 and, in contrast, the screw eye, prevents the ball 22 from being pulled at an angle when the ball 22 is in its raised position. This allows damage to the ball 22 to be reduced.

Figure 4A:
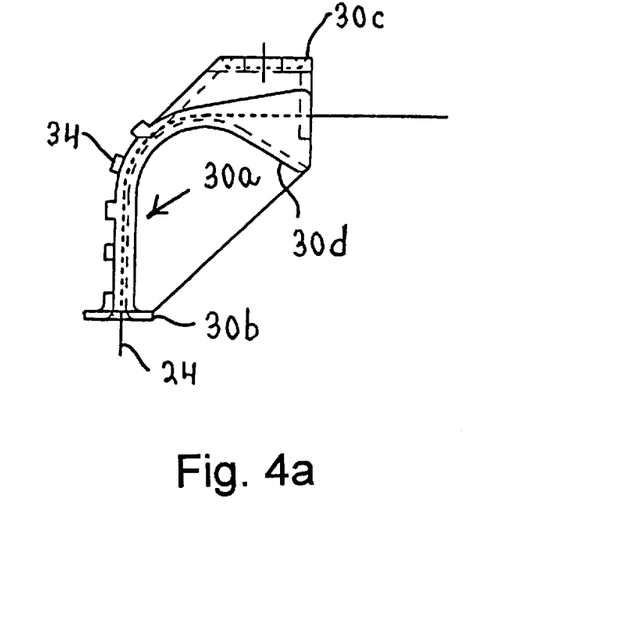
Figure 4B:
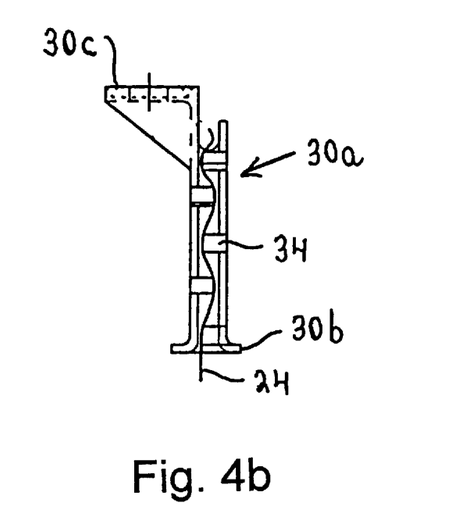
Figure 4C:
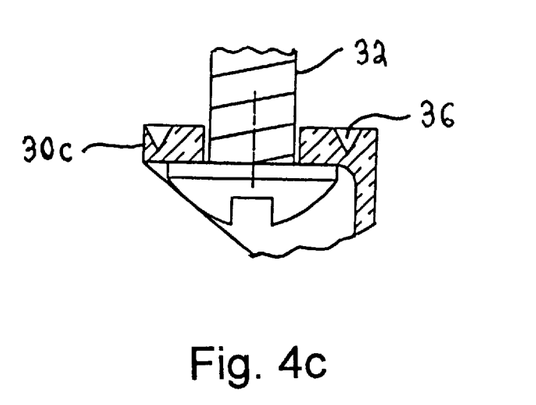
FIG. 4c is an enlarged fragmentary sectional view illustrating a detail of the additional cord guide.

A modified elbow is shown in FIGS. 4a–4c where the same reference characters as before are used to identify similar elements.

The elbow of FIGS. 4a–4c differs from that of FIGS. 3a and 3b in that tabs 34 are formed along the outer radius of the curved section 30a. The cord 24 is threaded through the tabs 34 as illustrated in FIG. 4b. The placement of the tabs 34 along the outer radius; of the curved section 30a facilitates threading of the cord 34, and the tabs 34 inhibit pulling of the cord 24 away from the elbow.

Contrary to the elbow of FIGS. 3a and 3b, the curved section 30a of the elbow of FIGS. 4a–4c has an enlarged portion 30d adjacent to the attachment flange 30c. The enlarged portion 30d has an opening through which the cord 24 exits the elbow, and the enlarged portion 30d diverges in a direction towards this opening so that the cord 24 can follow the motion of the garage door 20 without rubbing against the edges of the opening.

The attachment flange 30c of the elbow of FIGS. 4a–4c is provided with a circular groove 36 which surrounds the opening for the attachment screw 32. The groove 36, which can be seen in FIG. 4c, is designed to permit the curved section 30a to break away when the load on the cord 24 reaches a predetermined value.

Figure 5:
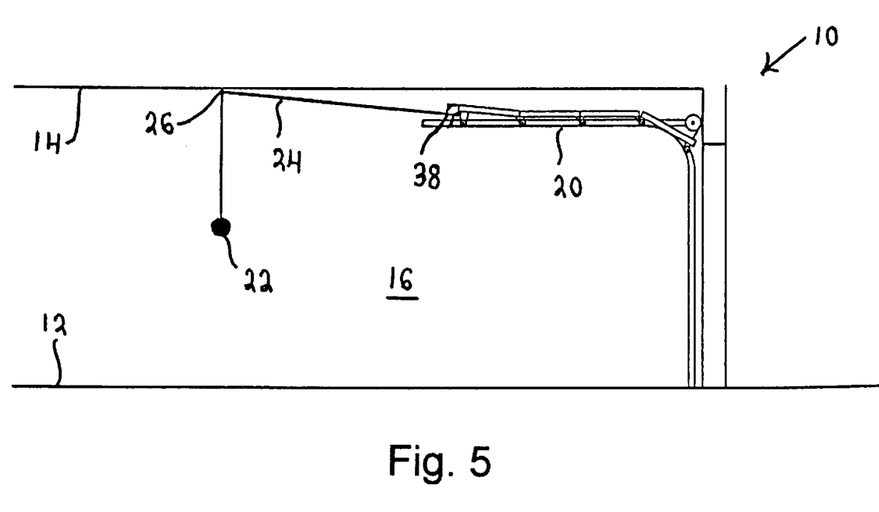
FIG. 5 is a schematic sectional side view of a garage illustrating one embodiment of a parking position indicating arrangement in accordance with the invention.

Turning to FIG. 5, the same reference characters as earlier denote similar elements.

FIG. 5 shows a parking position indicating arrangement in which the cord 24 is connected to a coiling or winding member 38 mounted on the garage door 20.

Figure 6:
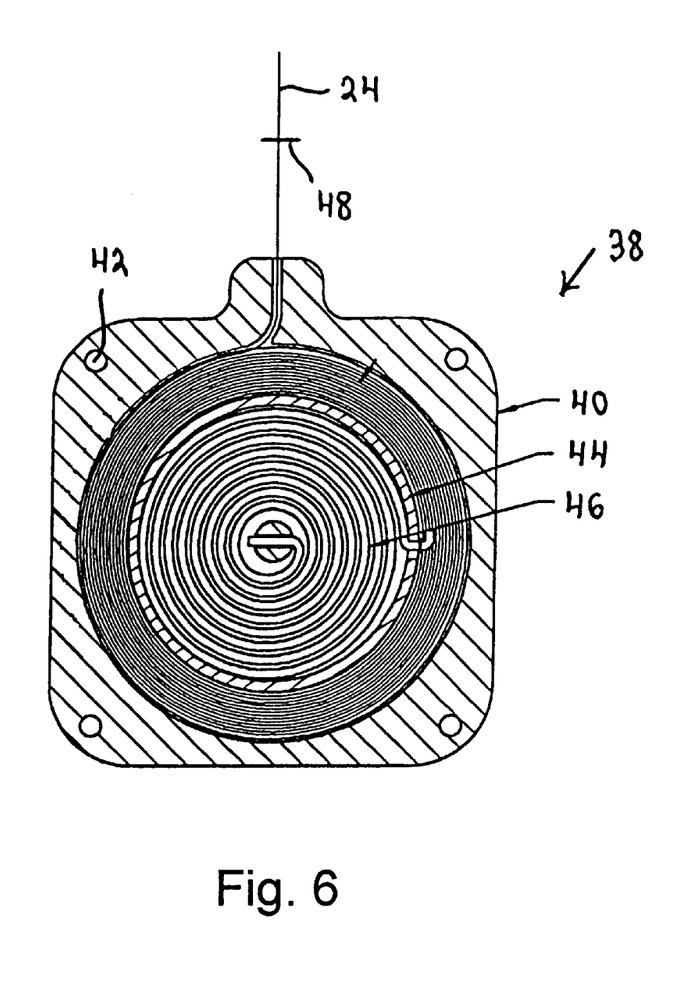
FIG. 6 is a sectional view of a reel constituting part of the parking position indicating arrangement of FIG. 5.

As shown in FIG. 6, the coiling member 38 includes a housing 40 having openings 42 for securing the coiling member 38 to the garage door 20. The housing 40 accommodates a reel 44 for winding up and paying out the cord 24. A coil spring or biasing element 46 acts on the reel 44 and urges the latter clockwise so that the reel 44 continuously attempts to wind up the cord 24. The spring 46, which directly engages the reel 44, constitutes an energy source or power source for driving the reel 44.

The cord 24 is provided with a stop 48 which is spaced from the ball 22 by a predetermined distance. The cord stop 48 is unable to enter the housing 40 and comes into abutment with the latter as the reel 44 winds up the cord 24. When the cord stop 48 abuts the housing 40, the reel 44 can no longer wind up the cord 24.

In FIG. 5, the garage door 20 is open and the ball 22 is in its lowered position. The cord stop 48 is in abutment with the housing 40 and a predetermined length of the cord 24 remains outside of the housing 40. This length is selected in such a manner that the ball 22 is suspended at the height of the windshield of the vehicle 18.

When the garage door 20 is closed, the coiling member 38 travels away from the cord guide 26. Initially, there is only minimal resistance to movement of the cord 24 through the guide 26 and this resistance is insufficient to overcome the coiling force of the spring 46. Accordingly, the ball 22 is pulled upward. Upon reaching its raised position, the ball 22 comes into abutment with the cord guide 26. At this time, the garage door 20 has not closed completely and continues to move together with the coiling member 38. Since the ball 22 is unable to pass through the cord guide 26, the tension in the cord 24 increases until it exceeds the coiling force of the spring 46. The cord 24 is thereupon payed out from the reel 44 and the cord stop 48 moves away from the housing 40. The cord 24 continues to be payed out until the garage door 20 reaches its closed position.

When the garage door 20 is subsequently opened, the coiling member 38 initially winds up the segment of the cord 24 between the coiling member 38 and the cord stop 48. During this time, the cord 24 exerts a pull on the ball 22 which remains in its raised position.

The cord stop 48 comes into abutment with the housing 40 before the garage door 20 reaches its open position. As the garage door 20 continues to move following abutment of the cord stop 48 and the housing 40, the pull on the ball 22 is relaxed and the ball 22 begins to drop under its own weight. The ball 22 arrives at its lowered position concurrently with the arrival of the garage door 20 at its open position.

Figure 7:
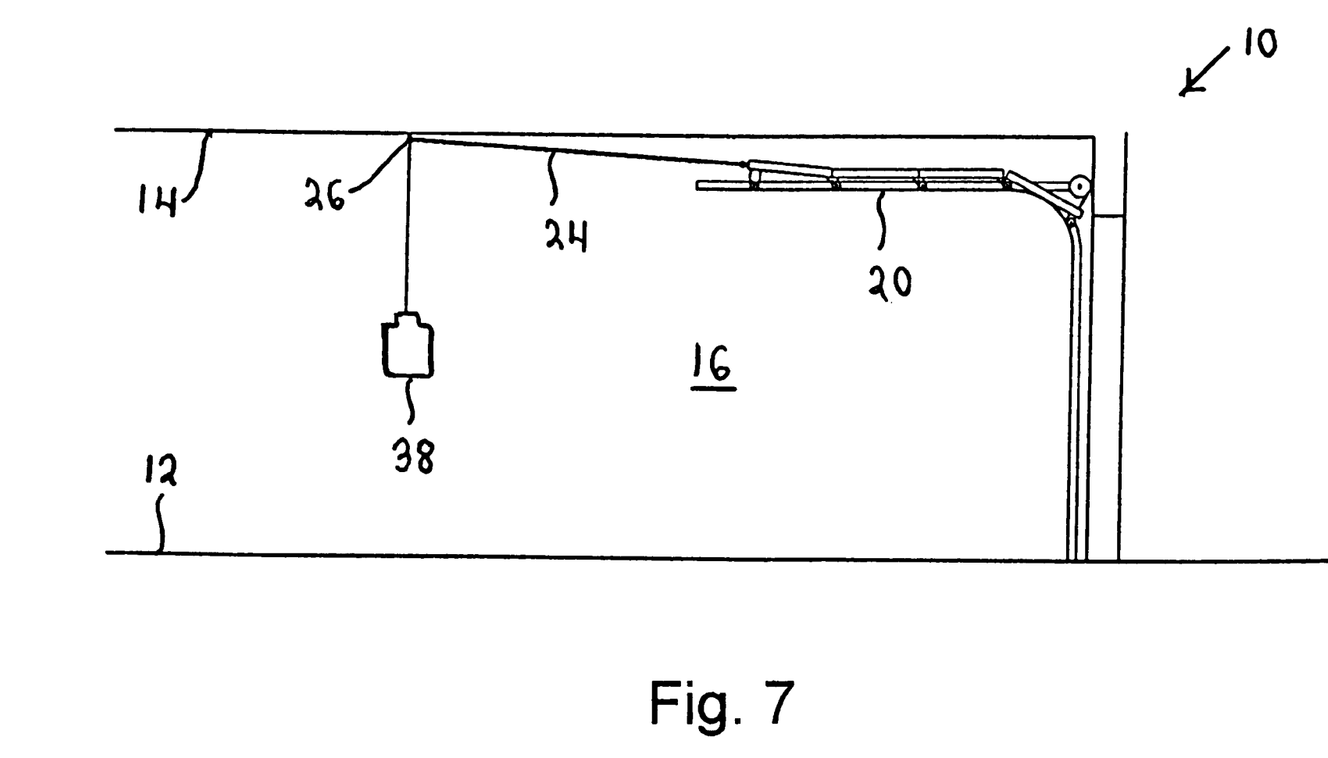
FIG. 7 is a schematic sectional side view of a garage showing another embodiment of a parking position indicating arrangement according to the invention.

Considering FIG. 7, the same reference characters as previously indicate similar elements.

In FIG. 7, the coiling member 38 replaces the ball 22 and is suspended from the cord 24. Thus, the coiling member 38 here constitutes a pendant serving as a parking position indicator.

The garage door 20 is open in FIG. 7 and the coiling member 38 is in the lowered position. The cord 24 is again provided with the stop 48 which, however, is not visible in FIG. 7, and the stop 48 is in abutment with the housing 40 of the coiling member 38. A segment of the cord 24 extends outward of the housing 40 and passes through the cord guide 26 to the garage door 20. The end of this segment remote from the coiling member 38 is fixed to the garage door 20, and the length of the segment is such that the coiling member 38 is suspended at the height of the windshield of the vehicle 18 when the garage door 20 is in its open position.

By way of example, the cord 24 may be fixed to the garage door 20 via a screw, e.g., a pan head or washer head screw, or via a screw eye such as shown in FIG. 2.

Figure 8:
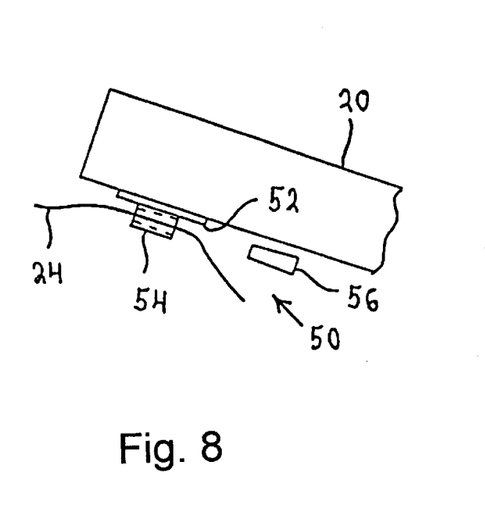
FIG. 8 is a side view illustrating one form of attachment device for connecting a cord constituting part of the parking position indicating arrangement of FIG. 7 to a garage door.

It is also possible to secure the cord 24 to the garage door 20 using an attachment device 50 illustrated in FIG. 8. The attachment device 50 includes a flat mounting element 52 having opposed major surfaces. One major surface lies against the garage door 20 and is preferably self-adhesive to adhere to the door 20. The other major surface carries a tubular element 54 through which the cord 24 is passed. Once the cord 24 has been passed through the tubular element 54, a plug 56 is inserted in the tubular element 54 to fix the cord 24.

In FIG. 8, it is assumed that any pull on the cord 24 is to the left. The plug 56 is thus inserted in the right end of the tubular element 54 to achieve a self-tightening effect.

Figure 9:
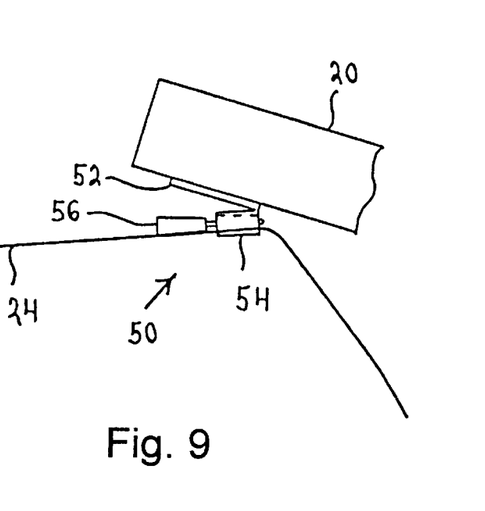
FIG. 9 is similar to FIG. 8 and shows another form of attachment device.

A modified form of the attachment device 50 is shown in FIG. 9 where the same reference characters as before identify similar elements. While the tubular element 54 in FIG. 8 is centered on and rigid with the mounting element 52, the tubular element 54 in FIG. 9 is shifted towards one edge of the mounting element 52. Furthermore, whereas the tubular element 54 in FIG. 8 is rigid with the mounting element 52, the tubular element 54 in FIG. 9 is hinged at one end to the mounting element 52. This enables the tubular element 54 to continuously align itself with the cord 24 so that the latter is never pulled at a sharp angle.

In FIG. 9, it is again assumed that any pull on the cord 24 is to the left. Contrary to FIG. 8, however, the plug 56 is inserted in the left end of the tubular element 54. The plug 56 is here designed to slip and release the cord 24 when the load on the cord 24 reaches et predetermined value.

The plug 56 may be attached to the tubular element 54 to prevent loss of the plug 56.

When the garage door 20 of FIG. 7 is closed, the cord 24 exerts a pull on the coiling member 38. Initially, the tension in the cord 24 is, insufficient to overcome the coiling force of the spring 46. Hence, the cord stop 48 remains in abutment with the housing 40 of the coiling member 38 and the coiling member 38 is pulled upward. When the coiling member 38 arrives at its raised position, the coiling member 38 abuts the cord guide 26. At this time, the garage door 20 has not closed completely and continues to move drawing the cord 24 along. Inasmuch as the coiling member 38 cannot pass through the cord guide 26, the tension in the cord 24 increases until it exceeds the coiling force of the spring 46. The cord 24 is thereupon payed out from the reel 44 while the cord stop 48, which is here small enough to pass through the cord guide 26, moves away from the housing 40. The cord 24 continues to be payed out until the garage door 20 reaches its closed position.

When the garage door 20 is subsequently opened, the coiling member 38 initially winds up the segment of the cord 24 between the coiling member 38 and the cord stop 48. During this time, the cord 24 exerts a pull on the coiling member 38 which remains in its raised position.

The cord stop 48 comes into abutment with the housing 40 of the coiling member 38 before the garage door 20 reaches its open position. As the garage door 20 continues to move following abutment of the cord stop 48 and the housing 40, the pull on the coiling member 38 is relaxed and the coiling member 38 begins to drop under its own weight. The coiling member 38 arrives at its lowered position concurrently with the arrival of the garage door 20 at its open position.

The coiling member 38 of FIG. 7 may be provided with an arresting mechanism which allows the reel 44 to be fixed against rotation and to be released in response to a predetermined stimulus. The arresting mechanism can include a frictional clutch or brake, a ratchet, a pawl or a locking pin among others. The arresting mechanism can be rendered operative and inoperative by gravity, by a pendulum-type device or by electrical switching means, e.g., a switch actuated by a motion sensor.

Such an arresting mechanism can be employed to cause the coiling member 38 of FIG. 7 to retract automatically from its lowered position when the vehicle 18 is properly positioned in the garage 10. For instance, the arresting mechanism can be designed so that the coiling member 38 rises in response to motion, in response to proximity of the vehicle 18 or in response to impact of the windshield of the vehicle 18 against the coiling member 38.

The coiling member 38 can likewise be provided with switching means for lights and/or sound generators. The switching means may include a mechanically actuated switch, a proximity switch, an optical switch, a mercury switch or a magnetically actuated switch among others.

It is sometimes desirable to move about the garage 10 when the vehicle 18 is out and the garage door 20 is open. However, with the garage door 20 open, the ball 22 of FIG. 5 or the coiling member 38 of FIG. 7 is in the lowered position and hinders freedom of movement.

This situation can be alleviated by grasping the ball 22 or the coiling member 38 and then pulling the same to pay out an extra segment of the cord 24. The length of this extra segment is sufficient to attach the ball 22 or the coiling member 38 to the downward facing surface of the garage door 20. Attachment of the ball 22 or coiling member 38 to the garage door 20 may be carried out magnetically, frictionally or mechanically. Mechanical attachment can be accomplished using a hook-and-loop fastener, a snap, a pinching device, or a cup or cradle which matches the shape of the ball 22 or the coiling member 38. The ball 22 or coiling member 38 can be attached to the garage door 20 in such a manner that the ball 22 or coiling member 38 releases automatically when the garage door 20 is closed.

Instead of pulling on the ball 22 or the coiling member 38, it is possible to pull on the section of the cord 24 between the garage door 20 and the cord guide 26. By virtue of this action, the ball 22 or the coiling member 38 will move to the raised position. Additional pulling following arrival of the ball 22 or the coiling member 38 at the raised position will cause an extra segment of the cord 24 to be payed out. The length of the extra segment is sufficient to loop the cord 24 around an anchoring element mounted on the downward facing surface of the garage door 20. The anchoring element can be designed so that the cord 24 slips off the anchoring element as the garage door 20 is closed. For instance, the anchoring element can be a disk, or a rigid or flexible pin.

The reel 44 of the coiling member 38 can be considered to be a self-winding reel.

Figure 10:
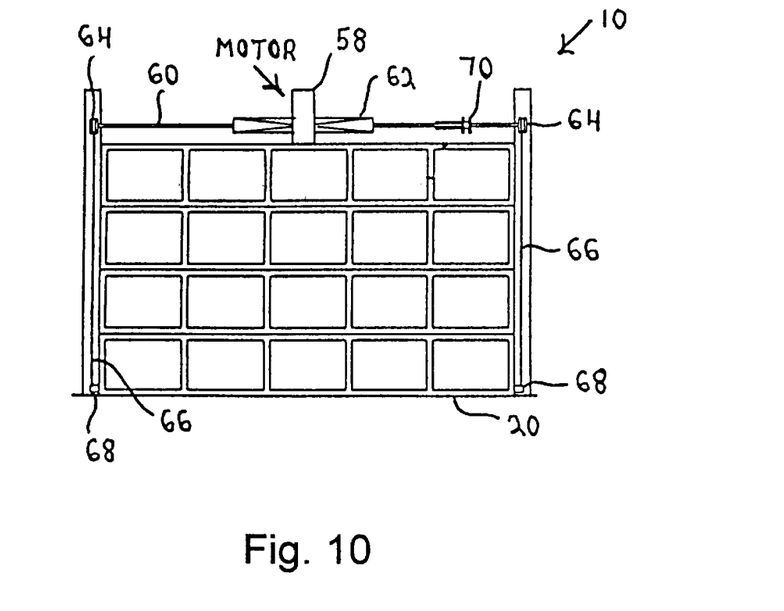
FIG. 10 is a schematic sectional rear view of a garage illustrating an additional embodiment of a parking position indicating arrangement in accordance with the invention.

Turning to FIG. 10, the same reference characters as earlier indicate similar elements.

FIG. 10 shows certain components of a conventional automatic garage door opener or moving means for the garage door 20. These components include a motor 58 confined in a housing or casing, a torsion shaft 60, and a torsion spring 62 which is mounted on the shaft 60 and exerts a torsional force on the same. A spool 64 is secured to either end of the shaft 60, and a cable 66 extends from each spool 64 to the lower end of the garage door 20. The cables 66 are fastened to rods 68 projecting to the sides of the garage door 20 at the lower end thereof.

A coiling member 70 is mounted on the torsion shaft 60 for rotation therewith. The coiling member 70 serves to wind up and pay out the non-illustrated cord 24 which carries a pendant constituting a parking position indicator.

Figure 11A:
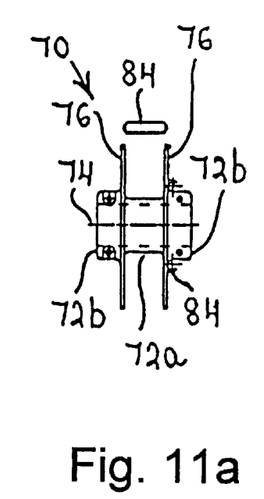
FIGS. 11a and 11b are respectively an elevational view and a side view of a coiling member forming part of the parking position indicating arrangement of FIG. 10 and having a variable winding circumference.

Referring to FIG. 11*a*, the coiling member 70 includes a reel which comprises a tubular winding core having an axis of rotation 74. Two flanges 76 are mounted on the core and are spaced from one another axially thereof. The core has a central portion 72*a* between the flanges 76 and an end portion 72*b* to the outside of each flange 76. The cord 24 is wound around the core central portion 72*a*.

The core end portions 72*b* have greater wall thicknesses than the core central portion 72*a*. Due to the greater wall thicknesses of the core end portions 72*b*, the core end portions 72*b* have larger outer diameters than the core central portion 72*a*.

Figure 11B:
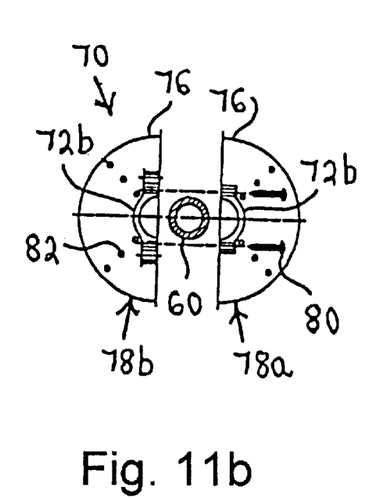

FIG. 11*b* shows that the reel 72*a*, 72*b*, 76 is divided into two discrete parts 78*a* and 78*b* in a plane containing the rotational axis 74 of the winding core 72*a*, 72*b*. The reel parts 78*a*, 78*b* are held together by fastening elements in the form of screws 80 which extend into threaded passages in the core end portions 72*b*. Each core end portion 72*b* has two such passages which run transverse to the rotational axis 74 of the core 72*a*, 72*b*. Part of each passage is located in the reel part 78*a* and part in the reel part 78*b*. As illustrated in FIG. 11*b*, the reel 72*a*, 72*b*, 76 can be placed around the torsion shaft 60 by separating the reel parts 78*a*, 78*b* from one another. Once the reel parts 78*a*, 78*b* have been positioned on the torsion shaft 60 in the proper alignment, the screws 80 are inserted in the respective threaded passages to join the reel parts 78*a*, 78*b* to one another and fix the reel 72*a*, 72*b*, 76 on the shaft 60.

Considering still FIG. 11*b*, each of the flanges 76 is formed with a series of openings 82. Half of the openings 82 on each flange 76 lie on a first diameter of the respective flange 76 while half lie on a second diameter perpendicular to the first diameter. Each of the openings 82 in one of the flanges 76 is in register with a respective opening 82 in the other of the flanges 76.

Turning to FIG. 11*a* in conjunction with FIG. 11*b*, a pin 84 is insertable in any pair of registering openings 82. Insertion of a pin 84 in a pair of registering openings 82 changes the effective circumference or winding circumference of the coiling member 70. Thus, when the cord 24 is wound onto the reel 72a, 72b, 76 following insertion of a pin 84 in a pair of registering openings 82, the cord 24 passes around the pin 84. Pins 84 may be inserted in more than one pair of registering openings 82 at one time thereby permitting a large number of effective circumferences to be obtained. Normally, up to four pins 84 will be used at the same time. Unused pins 84 can be clipped to the reel 72a, 72b, 76 as shown in FIG. 11a., The pins 84 allow the coiling member 70 to be adjusted to different situations so that a pendant suspended from the cord 24 has the proper travel.

Figure 12:
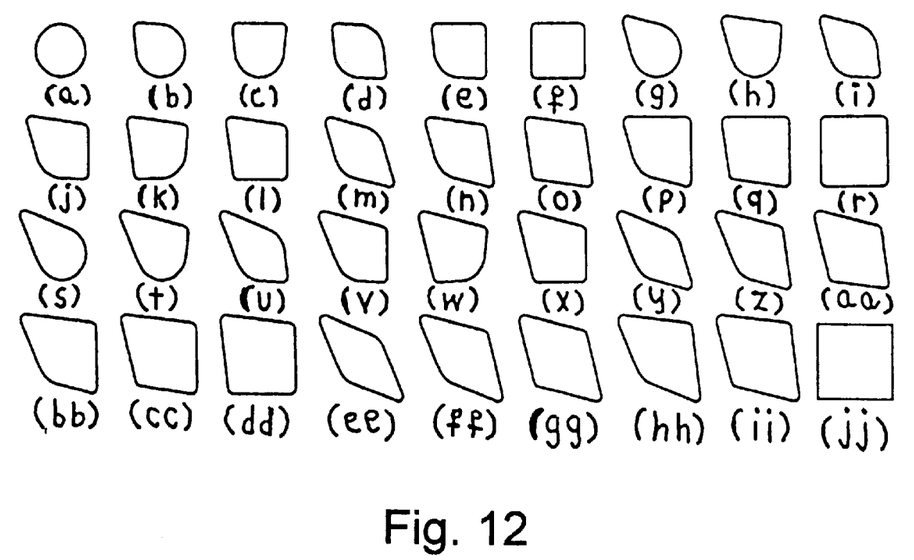

FIGS. 12a–12jj illustrate the various shapes formed by the cord 24 when wound onto the reel 72a, 72b, 76 with and without the pins 84. In FIG. 12a, the cord 24 is wound directly onto the winding core 72a while in FIG. 12jj the cord 24 is wound around four pins 84 inserted in the outermost pairs of registering openings 82. The effective circumference of the coiling member 70 increases from FIG. 12a to FIG. 12jj.

Returning to FIG. 10, it is assumed that the cord 24 has been wound onto the reel 72a, 72b, 76 and passed through the non-illustrated cord guide 26. It is further assumed that a pendant is suspended from the cord 24 and is movable from a raised position when the garage door 20 is closed to a lowered position when the garage door 20 is open, and vice versa. The garage door 20 is closed and the pendant is in its raised position.

Upon activation of the motor 58, the motor 58 begins to lift the garage door 20 so as to open the same. As the motor 58 lifts the garage door 20, the torsion spring 62 rotates the torsion shaft 60 and the spools 64 mounted thereon. The cables 66 are wound onto the spools 64 and assist in lifting the garage door 20.

The reel 72a, 72b, 76, which is fixed to the shaft 60, also rotates under the action of the torsion spring 62 to pay out the cord 24. The pendant suspended from the cord 24 drops under its own weight as the cord 24 is payed out and reaches its lowered position concurrently with the arrival of the garage door 20 at its open position. The torsion spring 62 here constitutes an energy source or power source which acts on the reel 72a, 72b, 76 through the agency of the torsion shaft 60.

When the motor 58 is reactivated after opening the garage door 20, the motor 58 pushes the garage door 20 downward. The cables 66 attached to the garage door 20 are payed out from the spools 64 and cause the torsion shaft 60 to rotate in the opposite sense from before. Consequently, the tension in the torsion spring 62, which was reduced during opening of the garage door 20, is increased once more. Furthermore, the reel 72a, 72b, 76 rotates with the shaft 62 to wind up the cord 24 and return the pendant suspended therefrom to its raised position.

Figure 13:
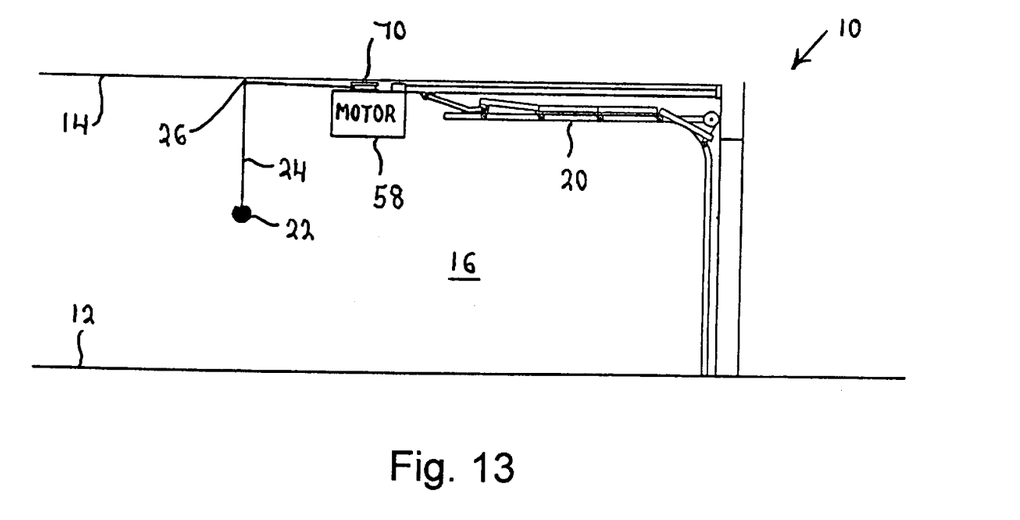
FIG. 13 is a schematic sectional side view of a garage showing a further embodiment of a parking position indicating arrangement according to the invention.

Referring to FIG. 13, the same reference characters as previously identify similar elements.

In FIG. 13, the coiling member 70 is connected to the shaft of the motor 58. The garage door 20 is open and the ball 22 is in its lowered position.

When the motor 58 is actuated to close the garage door 20, the motor shaft rotates the coiling member 70 to wind up the cord 24 and move the ball 22 to its raised position. The ball 22 reaches its raised position at the same time that the garage door 20 arrives at its closed position. Subsequent actuation of the motor 58 to open the garage door 20 causes the coiling member 70 to rotate in the opposite sense from before. The cord 24 is then payed out and the ball 22 drops to its lowered position under its own weight.

The motor 58 in FIG. 13 constitutes an energy source or power source which acts directly on the coiling member 70.

The coiling member 70 may be replaced by other types of coiling members or reels having variable winding circumferences. It is also possible to replace the coiling member 70 by a coiling member or reel with a fixed winding circumference.

Figure 14:
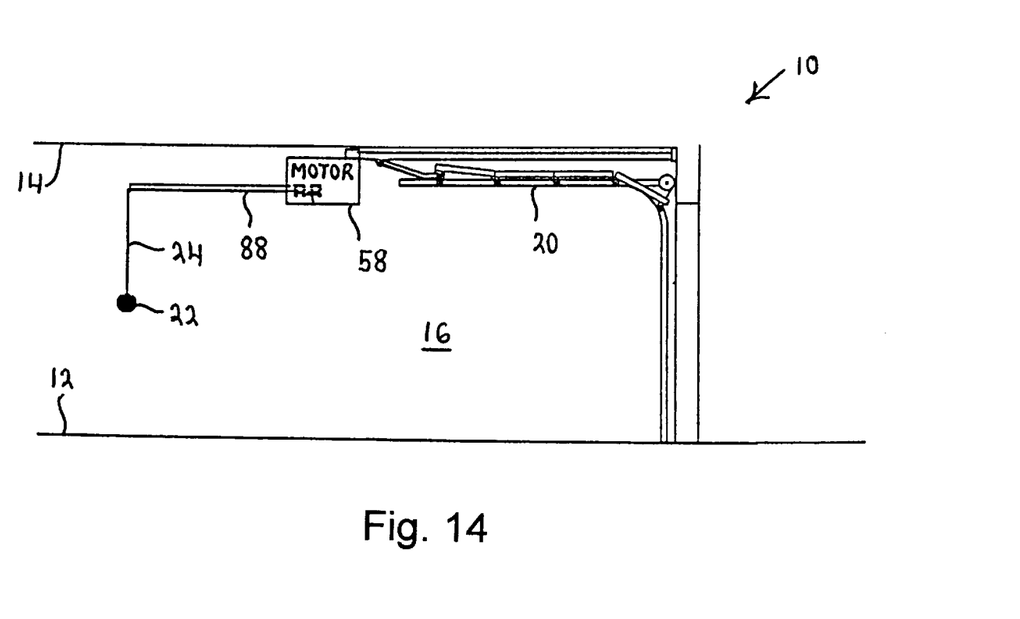
FIG. 14 is a schematic sectional side view of a garage illustrating still another embodiment of a parking position indicating arrangement in accordance with the invention.

Turning to FIG. 14, the same reference characters as before denote similar elements.

In FIG. 14, an elongated suspension device 88 resembling a fishing pole projects from the housing of the motor 58 and has an end which is spaced therefrom. The suspension device 88 includes a reel which is located inside the motor housing and is connected to the shaft of the motor 58. The cord 24 is attached to the reel and, similarly to the line of a fishing pole, runs along the suspension device 88 to and beyond the end of the suspension device 88 remote from the motor 58. The length of the suspension device 88 is adjustable to permit positioning of the ball 22 at the appropriate location of the garage 10. The suspension device 88 makes it unnecessary to mount the cord guide 26 on the ceiling 14 or the garage 10.

The operation of the arrangement of FIG. 14 is similar to that of the arrangement of FIG. 13. Multiple suspension devices 88 can be employed as can multiple pendants like the ball 22.

Figure 15A:
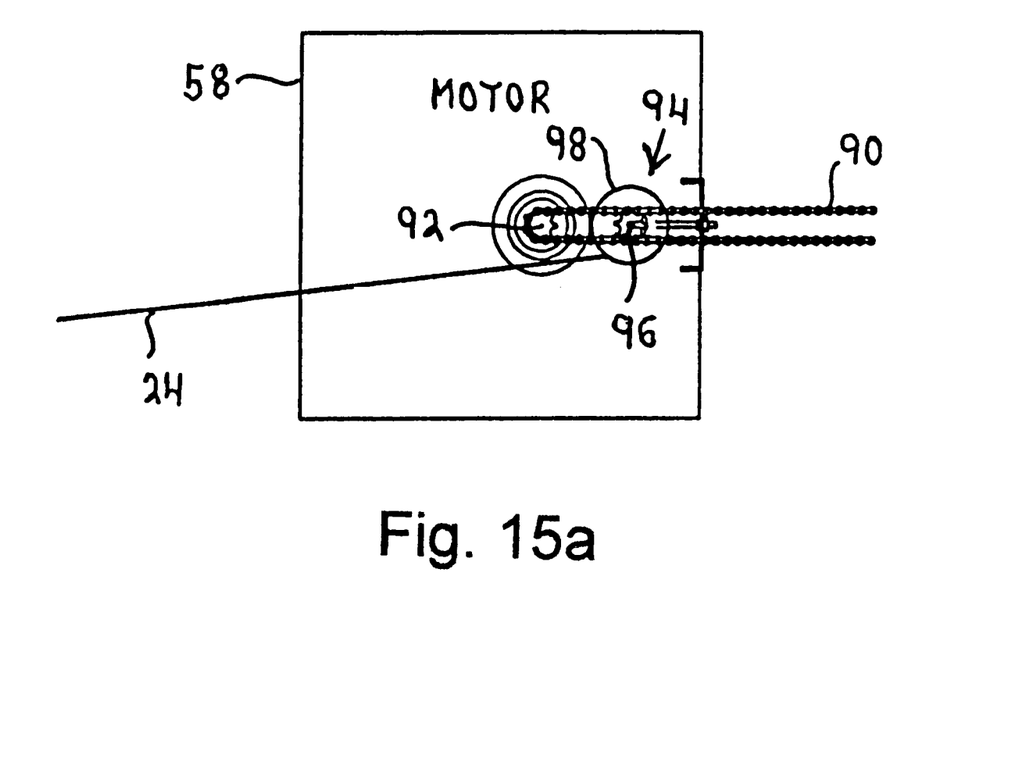
FIGS. 15a and 15b are respectively a schematic top view and side view of part of a garage door opener showing one more embodiment of a parking position indicating arrangement according to the invention.
Figure 15B:
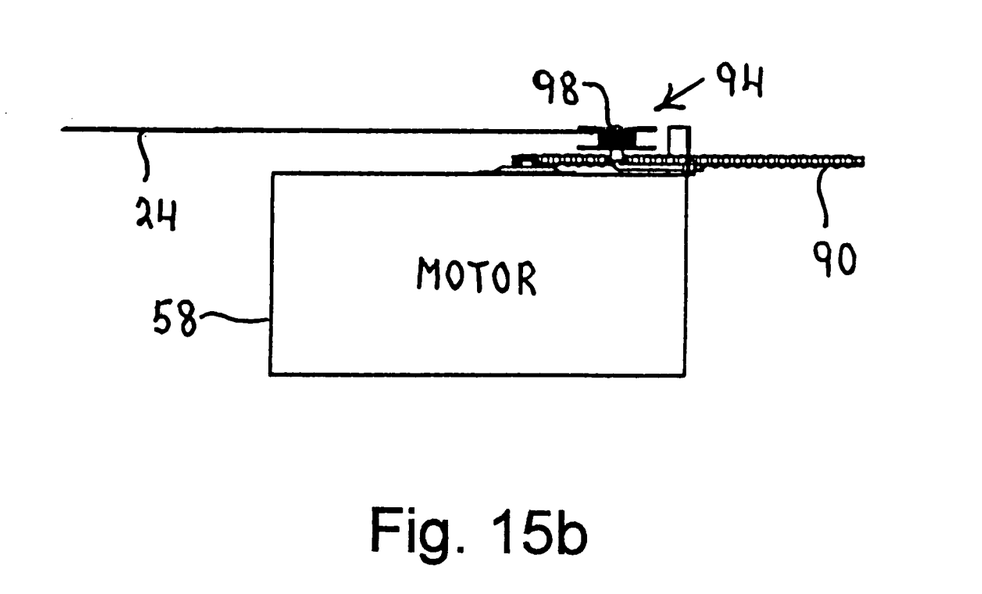

Referring to FIGS. 15a and 15b, the same reference characters as earlier identify similar elements.

In FIGS. 15a and 15b, the non-illustrated garage door 20 is driven by a conventional chain drive including a chain 90. The shaft of the motor 58 is provided with a sprocket 92 which engages the chain 90.

A coiling member 94 is mounted on the chain 90. The coiling member 94 comprises a sprocket 96 in engagement with the chain 90 and a reel 98 fast with the sprocket 96. The cord 24 is attached to the reel 98 and carries a non-illustrated pendant which is movable from a raised position when the garage door 20 is closed to a lowered position when the garage door 20 is open, and vice versa.

When the motor 58 is activated to open the garage door 20, the motor 58 urges the chain 90 along an endless path. The arrangement is such that the chain 90 thereupon rotates, the sprocket 96 and reel 98 of the coiling member 96,98 in a sense to pay out the cord 24 from the reel 98. The pendant suspended from the cord 24 then drops to its lowered position under its own weight. On the other hand, when the motor 58 closes the garage door 20, the sprocket 96 and reel 98 of the coiling member 96,98 are rotated so as to wind up the cord 24. As a result, the pendant is lifted to its raised position.

Figure 16A:
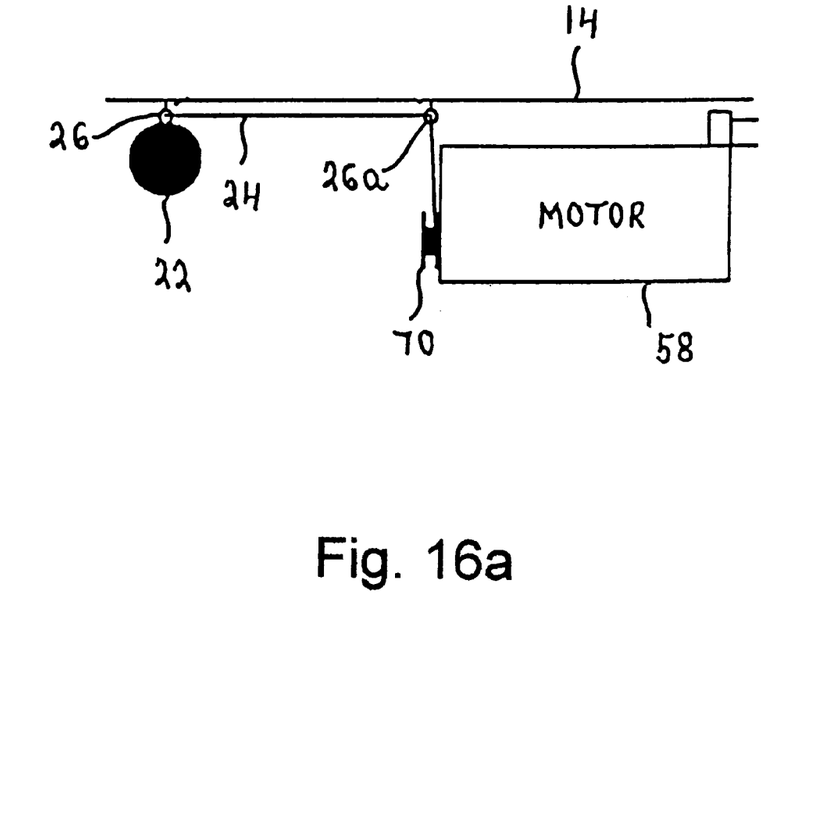
FIGS. 16a and 16b are respectively a schematic side view and rear view of part of a garage door opener illustrating yet a further embodiment of a parking position indicating arrangement in accordance with the invention.
Figure 16B:
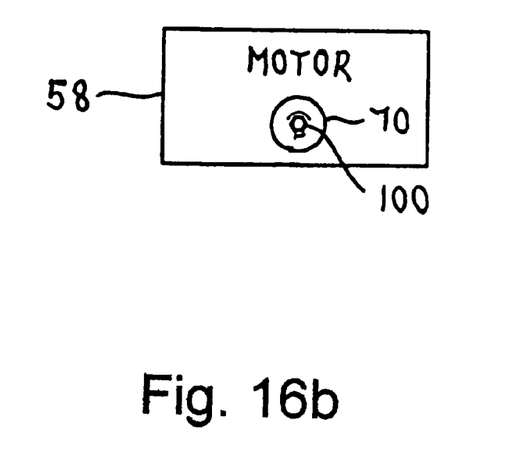

Considering FIGS. 16a and 16b, the same reference characters as previously indicate similar elements.

In FIGS. 16a and 16b, the non-illustrated garage door 20 is driven by a conventional screw-type garage door opener having a safety clutch adjustment shaft 100 which projects from the housing of the motor 58. The reel 70 is mounted on the clutch adjustment shaft 100 for rotation therewith, e.g., by press fitting or clamping, and the cord 24 is attached to the reel 70. In order for the cord 24 to slide smoothly, the cord 24 runs from the reel 70 to a guide 26a directly above the reel 70 and then to the guide 26. As before, the ball 22 is suspended from the cord 24 and is movable from a raised position when the garage door 20 is closed to a lowered position when the garage door 20 is open, and vice versa.

Upon activation of the motor 58 to open the garage door 20, the motor 513 causes the clutch adjustment shaft 100 to rotate. The clutch adjustment shaft 100, in turn, rotates the reel 70 in a direction to pay out the cord 24 from the reel 70. The ball 22 then drops to its lowered position under its own weight. When the garage door 20 is subsequently activated to close the garage door 20, the clutch adjustment shaft 100 rotates the reel 70 so as to wind up the cord 24. Consequently, the ball 22 is lifted to its raised position.

The distance traveled by the garage door 20 during movement between the closed position and the open position will normally differ from the distance traveled by the pendant during movement between the raised position and the lowered position. The parking position indicating arrangement of the invention thus constitutes a means for permitting the garage door 20 to travel one distance while the pendant travels another distance or a means to compensate for the difference in the distance traveled by the garage door 20 and the distance traveled by the pendant.

The pendant suspended from the cord 24 may have any shape and may be made of any of a variety of materials. Preferably, at least the outer layer of the pendant is soft to prevent damage to vehicles and injury to people. It is also desirable for the outer layer of the pendant to repel dirt and grease so that the appearance of the pendant will not be degraded by contact with dirty windshields. By way of example, the pendant can be made of foam rubber with a toughened and textured surface.

The pendant may include a jacket which can be replaced if it becomes unsightly or if the appearance of the pendant is to be changed.

The pendant can be designed to be painted or printed with ink. This allows the pendant to be colored and to be provided with text, logos, graphic designs, and so on.

The pendant can have a heavy duty, water-repellent coating to inhibit absorption of water which may be present on windshields exposed to snow and/or ice. Such a coating is recommended particularly where a garage may have temperatures below freezing since absorbed water could then freeze and essentially convert the pendant into an ice cube. The coating may additionally prevent the pendant from freezing to windshields.

The pendant may advertise a product, brand or company and can serve as a theft deterrent. Furthermore, the pendant can be hollow or solid and may have an internal magnet. Alternatively, all or part of the surface of the pendant may be magnetic. The surface of the pendant can also constitute part of a hook-and-loop fastener.

The pendant can be designed to glow in the dark or may be provided with one or more steady or flashing lights. If the pendant has more than one light, the lights can be of different color. The lights magi be located at the surface of the pendant or internally thereof. In the latter case, the pendant can be translucent and the lights can be arranged to cause the pendant to change color. The lights may be controllable together or individually, and control may be achieved through a timing device, an increase or release of the tension in the cord 24, or motion, impact or remote sensing, among others.

The pendant may include a sound generator. Thus, the pendant can be provided with a device which can beep or buzz, or with a speaker or mechanical device for producing music, speech or other sounds. By way of example, the pendant can be designed to generate the word "stop" and/or foreign equivalents thereof. The sound generator may be controlled in the same manner as the lights.

The pendant may have a replaceable, rechargeable or lifetime battery for operating the lights and/or sound generator. Alternatively, the pendant may be provided with an electrical generating means.

The pendant can be motorized. It is further possible for the pendant to be scented or to be capable of releasing a scent, The pendant may be provided with a storage compartment, e.g., for excess cord or for hardware required for installation. By storing hardware required for installation in a compartment within the pendant, separate packaging for the hardware can be eliminated.

The cord 24 may be permanently or removably attached to the pendant. Moreover, the pendant can be suspended from more than one cord. Suspension of the pendant from more than one cord may be desirable when the pendant should always be in the same orientation relative to a driver of the vehicle 18. This would be the case, for instance, when the pendant is used as a sign. The pendant might then be suspended from two cords. If more than one cord is employed for the pendant, each cord may be wound onto its own reel. Alternatively, the different cords may be wound onto the same one-piece reel or onto different parts of a divided reel. It is also possible for the pendant to be suspended from multiple cords which are united into a single line between the pendant and a reel. This line is then wound onto the reel.

The cord 24 may be made from any of a variety of flexible natural and synthetic materials including metal and plastic. The cord 24 may be a single-strand cord, a multistrand cord or a chain, e.g., a bead chain. Furthermore, the cord 24 can be either smooth or textured. It is further possible for the cord 24 to be colored or to glow in the dark.

Since the cord 24 can become tangled or knotted, or can catch on, wind around or become tied to an object or person, certain precautions are desirable in order to prevent injury to persons and damage to objects. For instance, it is preferred for the cord 24 to have a low test strength, e.g., 15 to 50 lbs. Moreover, the parking position indicating arrangement of the invention can be designed so that the tension in the cord 24 is released when the load on the cord 24 reaches a predetermined value. The tension in the cord 24 can be released in different ways including the following:

1. A frangible connection can be provided between the cord 24 and the pendant in case the pendant becomes caught on an object or person.
2. Where the cord 24 is connected to the garage door 20, the connection may be designed such that the cord 24 slips when the load on the cord 24 rises to the predetermined value. An example of a connection of this type is illustrated in FIG. 9.
3. Where the reel 38 is connected to the garage door 20, a frangible connection can be provided between the reel 38 and the garage door 20.
4. Where the cord 24 extends through the cord guide 26 mounted on the ceiling 14 of the garage 10, the cord guide 26 may be designed to break off when the load on the cord 24 reaches the predetermined value. Such a design is shown in FIG. 4.
5. Where the cord 24 is mounted on the suspension device 88, the suspension device 88 can have a component which separates from the remainder of the suspension device 88 when the load on the cord 24 rises to the predetermined value.

Over time, elastic material loses its elasticity. The material eventually snaps when placed under tension giving rise to the possibility of injury and/or damage. By using a coiling member 38,70,94 to wind up and pay out the cord 24, it becomes unnecessary for all or part of the cord 24 to be elastic as in one of the parking position indicating arrangements of the prior art. The likelihood that the cord 24 will snap in such a manner as to cause damage or injury can thus be reduced.

In another parking position indicating arrangement of the prior art, the pendant is employed to drive a reel in one direction thereby making the arrangement somewhat complex. Inasmuch as the reel forming part of the coiling member 38,70,94 of the invention is driven in one direction by an energy source which constitutes part of the garage door opener or part of the coiling member 38,70,94, use of the pendant as a drive for the reel may be avoided.

Various modifications, in addition to those outlined above, are possible within the meaning and range of equivalence of the appended claims.

I claim:

1. A garage comprising:
    a garage door movable between a closed position and an open position;
    means for moving said garage door between said closed position and said open position; and
    means for indicating a parking position when said garage door is in said open position, said indicating means including an elongated flexible element, and a coiling member for winding up and paying out said flexible element in response to movement of said garage door, said member including a reel driven by a biasing element which constitutes part of said member, and said reel being mounted on said garage door.

2. A garage comprising:
    a garage door movable between a closed position and an open position;
    means for moving said garage door between said closed position and said open position; and
    means for indicating a parking position when said garage door is in said open position, said indicating means including an elongated flexible element, and an indicator for said parking position, said indicator being a coiling member for winding up and paying out said flexible element in response to movement of said garage door, and said member including a reel driven by a biasing element which constitutes part of said member, said member being suspended from said flexible element.

3. A garage comprising:
    a garage door movable between a closed position and an open position;
    means for moving said garage door between said closed position and said open position; and
    means for indicating a parking position when said garage door is in said open position, said indicating means including an elongated flexible element, and a coiling member for winding up and paying out said flexible element in response to movement of said garage door, said coiling member being provided with means for varying the winding circumference of said coiling member.

4. The garage of claim 3, wherein said coiling member comprises a reel having winding core defining an axis of rotation, and a pair of axially spaced flanges on said core, each of said flanges having a plurality of openings, and each opening in one of said flanges being arranged to register with a respective opening in the other of said flanges, said member including at least one pin-like element insertable in registering ones of said openings to change the winding circumference of said coiling member.

5. The garage of claim 4, wherein said reel is divided into discrete parts in axial direction of said core, said reel including at least one connecting element for connecting said parts to one another.

6. The garage of claim 3, wherein said moving means includes a rotatable shaft connected to said garage door, said coiling member being mounted on said shaft.

7. The garage of claim 3, wherein said moving means comprises a motor means, said coiling member being mounted on said motor.

8. The garage of claim 3, wherein said moving means comprises a motor and a chain driven by said motor and connected to said garage door, said coiling member being mounted on said chain.

9. The garage of claim 8, wherein said member comprises a sprocket which engages said chain.

10. A method of operating a garage door comprising the steps of:
    moving said garage door from a closed position to an open position, the moving step being performed employing moving means;
    providing an indication of a parking position in response to the moving step;
    returning said garage door to said closed position, the returning step being performed employing said moving means; and
    removing said indication, the providing step and the removing step being performed using means for indicating said parking position, and said indicating means including an elongated flexible element, and a coiling member for winding up and paying out said flexible element in response to movement of said garage door, said member including a reel driven by a biasing element which constitutes part of said member, and said reel being mounted on said garage door.

11. A method of operating a garage door comprising the steps of:
    moving said garage door from a closed position to an open position, the moving step being performed employing moving means;
    providing an indication of a parking position in response to the moving step;
    returning said garage door to said closed position, the returning step being performed employing said moving means; and
    removing said indication, the providing step and the removing step being performed using means for indicating said parking position, and said indicating means including an elongated flexible element, and an indicator for said parking position, said indicator being a coiling member for winding up and paying out said flexible element in response to movement of said garage door, and said member including a reel driven by a biasing element which constitutes part of said member, said member being suspended from said flexible element, and the providing step including lowering said members the removing step including raising said member.

12. A method of operating a garage door comprising the steps of:
    moving said garage door from a closed position to an open position, the moving step being performed employing moving means;
    providing an indication of a parking position in response to the moving step;

returning said garage door to said closed position, the returning step being performed employing said moving means;

removing said indication, the providing step and the removing step being performed using means for indicating said parking position, and said indicating means including an elongated flexible element and a coiling member for winding up-and paying out said flexible element in response to movement of said garage door; and adjusting the winding circumference of said coiling member.

13. The method of claim 12, wherein said moving means includes a rotatable shaft connected to said garage door, said coiling member being mounted on said shaft.

14. The method of claim 12, wherein said moving means comprises a motor means, said coiling member being mounted on said motor.

15. The method of claim 12, wherein said moving means comprises a motor and a chain driven by said motor and connected to said garage door, said coiling member being mounted on said chain.

* * * * *

UNITED STATES PATENT AND TRADEMARK OFFICE
CERTIFICATE OF CORRECTION

PATENT NO. : 6,209,478 B1
DATED : April 3, 2001
INVENTOR(S) : Vern L. Curtis

It is certified that error appears in the above-identified patent and that said Letters Patent is hereby corrected as shown below:

Claim 2,
Line 41, replace the word "paving" with -- paying --.

Claim 4,
Line 61, after "having", insert -- a --.

Claim 7,
Line 11, delete "means".

Claim 12,
Line 59, replace "members" with -- member, --.

Claim 14,
Line 5, delete "means".

Signed and Sealed this

Sixth Day of November, 2001

*Attest:*

*Attesting Officer*

NICHOLAS P. GODICI
*Acting Director of the United States Patent and Trademark Office*